US012730840B2

(12) United States Patent
Olson

(10) Patent No.: US 12,730,840 B2
(45) Date of Patent: Sep. 8, 2026

(54) SEMANTIC-BASED FONT SEARCHING IN VECTOR SPACE USING MACHINE LEARNING

(71) Applicant: Sony Interactive Entertainment LLC, San Mateo, CA (US)

(72) Inventor: Joseph Logan Olson, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 18/797,379

(22) Filed: Aug. 7, 2024

(65) Prior Publication Data

US 2026/0044561 A1 Feb. 12, 2026

(51) Int. Cl.

*G06F 16/56* (2019.01)
*G06F 16/535* (2019.01)
*G06F 16/538* (2019.01)

(52) U.S. Cl.

CPC ............ *G06F 16/56* (2019.01); *G06F 16/535* (2019.01); *G06F 16/538* (2019.01)

(58) Field of Classification Search

None

See application file for complete search history.

(56) References Cited

U.S. PATENT DOCUMENTS 11,995,120 B1 * 5/2024 Kirke ...................... G06F 16/55
2023/0419367 A1 * 12/2023 Smith ................ G06Q 30/0269

FOREIGN PATENT DOCUMENTS

CN 113836933 A * 12/2021 ............. G06F 16/35
CN 114912431 B * 2/2025 ........... G06F 16/334

OTHER PUBLICATIONS

"CLIP: Connecting text and images", Jan. 5, 2021, retrieved from https://openai.com/index/clip/.
"The Easiest Way to Generate with AI", KREA, retrieved from https://www.krea.ai/home.
Sony, Redwan, "NLP-101: Understanding Word Embedding", 2020, retrieved from https://www.kaggle.com/code/redwankarimsony/nlp-101-understanding-word-embedding.

* cited by examiner

*Primary Examiner* — Tuankhanh D Phan
(74) *Attorney, Agent, or Firm* — Fish & Richardson P.C.

(57) ABSTRACT

In one aspect, semantic-based font searching may be performed in vector space using machine learning. Text and images may therefore be put into a same embedded vector space so that font images that are close, in the vector space, to a word from a font search query may be returned as search results. Thus, an end-user can enter a natural language search query string for the system to return fonts that semantically match the user's search string.

20 Claims, 6 Drawing Sheets

SEMANTIC-BASED FONT SEARCHING IN VECTOR SPACE USING MACHINE LEARNING

FIELD

The disclosure below relates to technically inventive, non-routine solutions that are necessarily rooted in computer technology and that produce concrete technical improvements. In particular, the disclosure below relates to semantic-based font searching in vector space using machine learning.

BACKGROUND

Currently, if a user wants to locate a font that is appropriate for whatever theme the user desires for a given project, the user is typically left to just scroll through fonts that are available through whatever application is being used for the project. This can be very painstaking and time-consuming, and might not even result in the user finding a font that suits their needs. There are currently no adequate solutions to the foregoing computer-related, technological problem.

SUMMARY

Accordingly, in one aspect an apparatus includes at least one processor system programmed with instructions to receive a text-based font search query. In response to receipt of the text-based font search query, the at least one processor system is programmed with instructions to convert one or more elements of the text-based font query into a first vector and to embed the first vector in vector space. The vector space includes vectors for text and includes vectors for images. The at least one processor system is also programmed with instructions to search, in the vector space, for image vectors that are close to the first vector according to the embedding of the first vector in the vector space. Therefore, based on the search, the at least one processor system is programmed with instructions to return a second vector. The second vector is an image vector corresponding to a particular text font. Based on the return of the second vector, the at least one processor system is programmed with instructions to then present an indication of the particular text font on a graphical user interface (GUI) as a search result to the text-based font search query.

Thus, in various implementations the second vector may also be embedded in the vector space. For example, the second vector may have been embedded in the vector space prior to receipt of the text-based font search query.

In various non-limiting examples, close to the first vector may be defined as being within a threshold number of closest image vectors, in the vector space, to the first vector according to the embedding of the first vector in the vector space. Closest image vectors may be determined using respective cosine similarity measurements for respective image vectors in the vector space.

Thus, in various particular non-limiting examples, the at least one processor system may be programmed with instructions to, based on the search, return plural image vectors that are close to the first vector according to the embedding of the first vector in the vector space. The second vector may be among the plural image vectors. The plural image vectors may be close to the first vector based on being within a threshold number of closest image vectors, in the vector space, to the first vector according to the embedding of the first vector in the vector space. Furthermore, in certain instances, each of the plural image vectors may be, in the vector space, text font image vectors that are close to the first vector, with each of the plural image vectors corresponding to a different respective text font.

Also in some example implementations, the one or more elements may consist of a single keyword identified from the text-based font search query.

Still further, if desired the at least one processor system may be configured to embed, in the vector space and as the second vector, data related to the particular text font, with the data embedded using a text-image embedding model. In one particular example, the text-image embedding model may include a contrastive language-image pretraining (CLIP) model. Also in one particular example, the at least one processor system may be configured to, prior to embedding the data in the vector space as the second vector, render the particular text font as an image, with the image establishing the data. The at least one processor system may then be configured to embed the image in the vector space as the second vector using the text-image embedding model.

In some instances, the indication of the particular text font as presented on the GUI may include an image of multiple characters in the particular text font, an image of a single character in the particular text font, a text description of the particular text font, a name of the particular text font, and/or a selector that is selectable to use the particular text font.

In another aspect, a method includes receiving a font search query. In response to receiving the font search query, the method includes converting one or more elements of the font query into a first vector and embedding the first vector in vector space, with the vector space including vectors for images. The method also includes searching, in the vector space, for image vectors that are close to the first vector according to the embedding of the first vector in the vector space. The method then includes, based on the searching, returning a second vector. The second vector is an image vector corresponding to a particular text font. The method also includes presenting, at a device, an indication of the particular text font based on the returning of the second vector.

In some examples, the method may include presenting the indication on a graphical user interface (GUI) as a search result to the font search query.

Additionally, in some examples close to the first vector may be defined as within a threshold number of closest image vectors, in the vector space, to the first vector according to the embedding of the first vector in the vector space.

In one particular example, the method may include, based on the search, returning plural image vectors that are close to the first vector according to the embedding of the first vector in the vector space. The second vector may be among the plural image vectors. The plural image vectors may be close to the first vector based on being within a threshold number of closest image vectors, in the vector space, to the first vector according to the embedding of the first vector in the vector space. Each of the plural image vectors may correspond to a different respective text font. The method may even include using respective cosine similarity measurements for respective image vectors in the vector space to determine the closest image vectors, in the vector space, to the first vector according to the embedding of the first vector in the vector space.

In still another aspect, an apparatus includes at least one computer readable storage medium (CRSM) that is not a transitory signal. The at least one CRSM includes instructions executable by a processor system to receive a font search query. In response to receipt of the font search query, the instructions are executable to convert one or more elements of the font query into a first vector and embed the first vector in vector space. The instructions are also executable to search, in the vector space, for one or more additional vectors that are close to the first vector according to the embedding of the first vector in the vector space. The instructions are also executable to, based on the search, return a second vector. The second vector corresponds to a particular text font. Based on the return of the second vector, the instructions are then executable to present a search result to the font search query, with the search result indicating of the particular text font.

In certain examples, the second vector may establish an image embedding in the vector space, with the image embedding representing an image of the particular text font.

Also in some examples, the second vector may establish a word embedding in the vector space, with the word embedding representing a text description of an appearance of the particular text font.

The details of the present application, both as to its structure and operation, can be best understood in reference to the accompanying drawings, in which like reference numerals refer to like parts, and in which:

DETAILED DESCRIPTION

Figure 1:
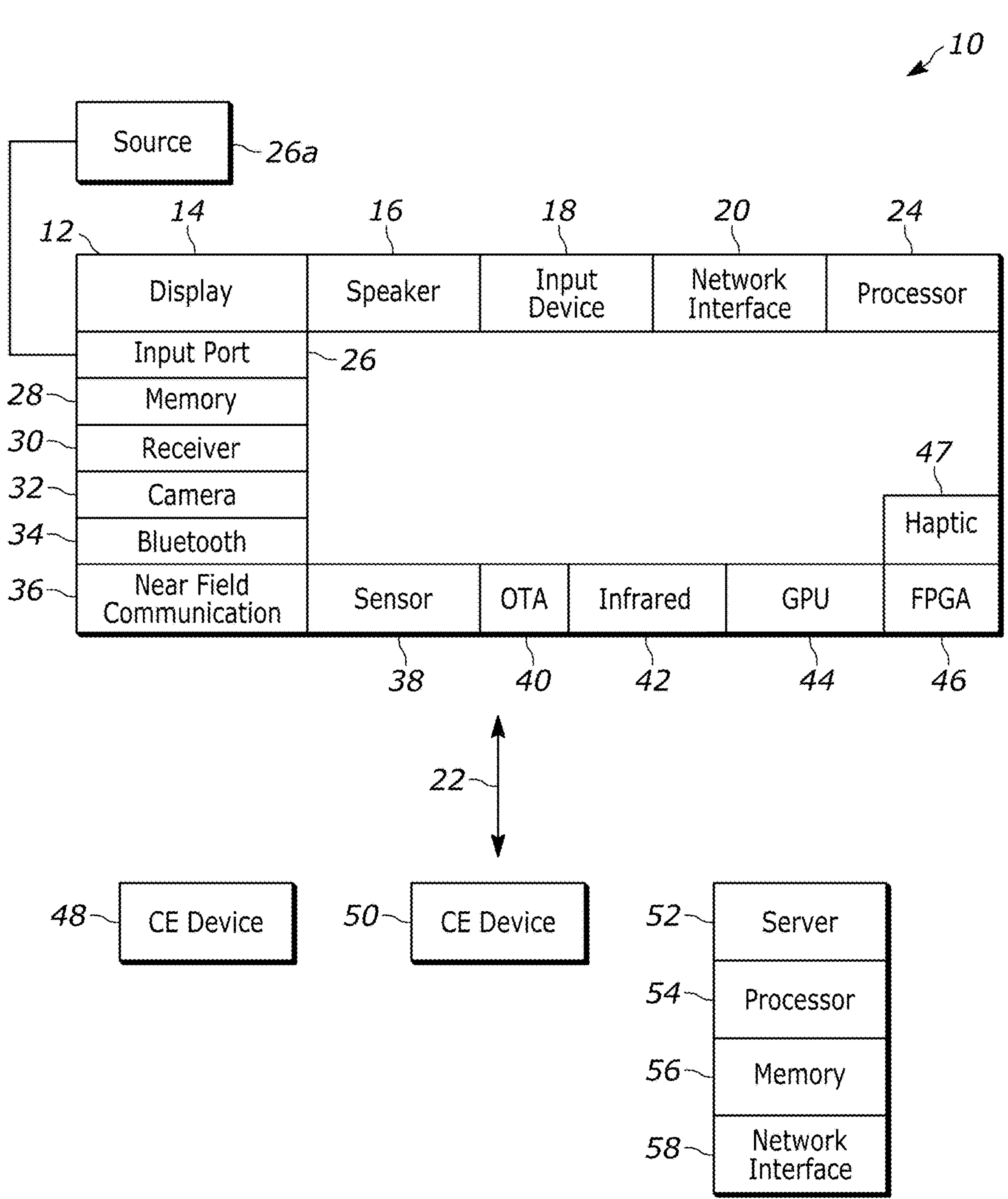
FIG. 1 is a block diagram of an example system consistent with present principles.

The detailed description below provides technical systems and methods for semantic font searching using vector embeddings. Thus, fonts may be searched by end-users who might describe a general vibe or theme in a query. So the user might type "spooky" or "classical" or "Las Vegas 1960s" and the machine learning-based system may return certain fonts from a vector database of multimodal embeddings (e.g., text-image embeddings) that are most-fitting to the particular search string or search term entered by the user.

Thus, if a user wished to find a font appropriate for the side of a spaceship in a video game or for a pitch deck to investors, the technical details discussed herein provide a technical system for the user to do so using the user's own natural language.

Thus, in one implementation a database of fonts may be accessed. Each font may then be rendered as an image. A contrastive language-image pretraining (CLIP) model or other text-image embedding model may then be used to generate an embedding vector for each font image.

The system can then search for fonts by embedding a user's natural language-based search term(s) as a vector in the same vector space as the font images themselves to then look for the closest font images in vector space (e.g., through a Cosine Similarity Search). A threshold number of the closest fonts may then be returned to the user as search results (e.g., closest nine fonts), where those results may be the procedurally rendered images that were used to create the font image embeddings in the first place. The tag or other metadata associated with each font image may indicate the associated font itself so that the user can select one of the results to command the system to use the selected font (as identified in the tag/metadata) in a word processing document, slide presentation, an email being composed, etc.

Thus, text-image embeddings may be effected in the same vector space using CLIP or another model, turning text and/or images into vectors (like a point in space) so the system can determine how similar a search word(s) and font image are to each other (e.g., how close those two points are in vector space).

However, note that in addition to or in lieu of using text-image embeddings, word embeddings alone may be used in some non-limiting instances. So, for example, a large multimodal model (e.g., GPT4) may be used to generate text descriptions of each rendered font image, and then a word embedding for each LMM-generated description may be used so that the closest word embeddings for various fonts can be returned as font search results to a given query. In some examples, this may lead to improved processing speeds and searching, with it being further noted that multimodal models may also yield their own technical improvements in terms of quality of search results. Either way, technical improvements are realized for user typography, where artificial intelligence (AI) models and machine learning are used to return relevant fonts to a user based on whatever natural language the user enters for the search.

With the foregoing in mind, it is to be understood that this disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor system may include one or more processors acting independently or in concert with each other to execute an algorithm, whether those processors are in one device or more than one device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

The term "a" or "an" in reference to an entity refers to one or more of that entity. As such, the terms "a" or "an", "one or more", and "at least one" can be used interchangeably herein.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12 consistent with present principles. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source **26*a* of audio video content. Thus, the source 26*a* may be a separate or integrated set top box, or a satellite receiver. Or the source 26*a* may be a game console or disk player containing content. The source 26*a* when implemented as a game console may include some or all of the components described below in relation to the CE device 48**.

The AVD 12 may further include one or more computer memories/computer-readable storage media 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command).

The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer/video game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player, or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components discussed in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network trained through machine learning may thus include an input layer, an output layer, and multiple hidden layers in between that are configured and weighted to make inferences about an appropriate output.

Also note before describing other figures that selectors and options on the GUIs discussed below may be selected via cursor input, touch input to the touch-enabled display on which the GUI is presented, using voice input, and/or using other input methods.

Figure 2:
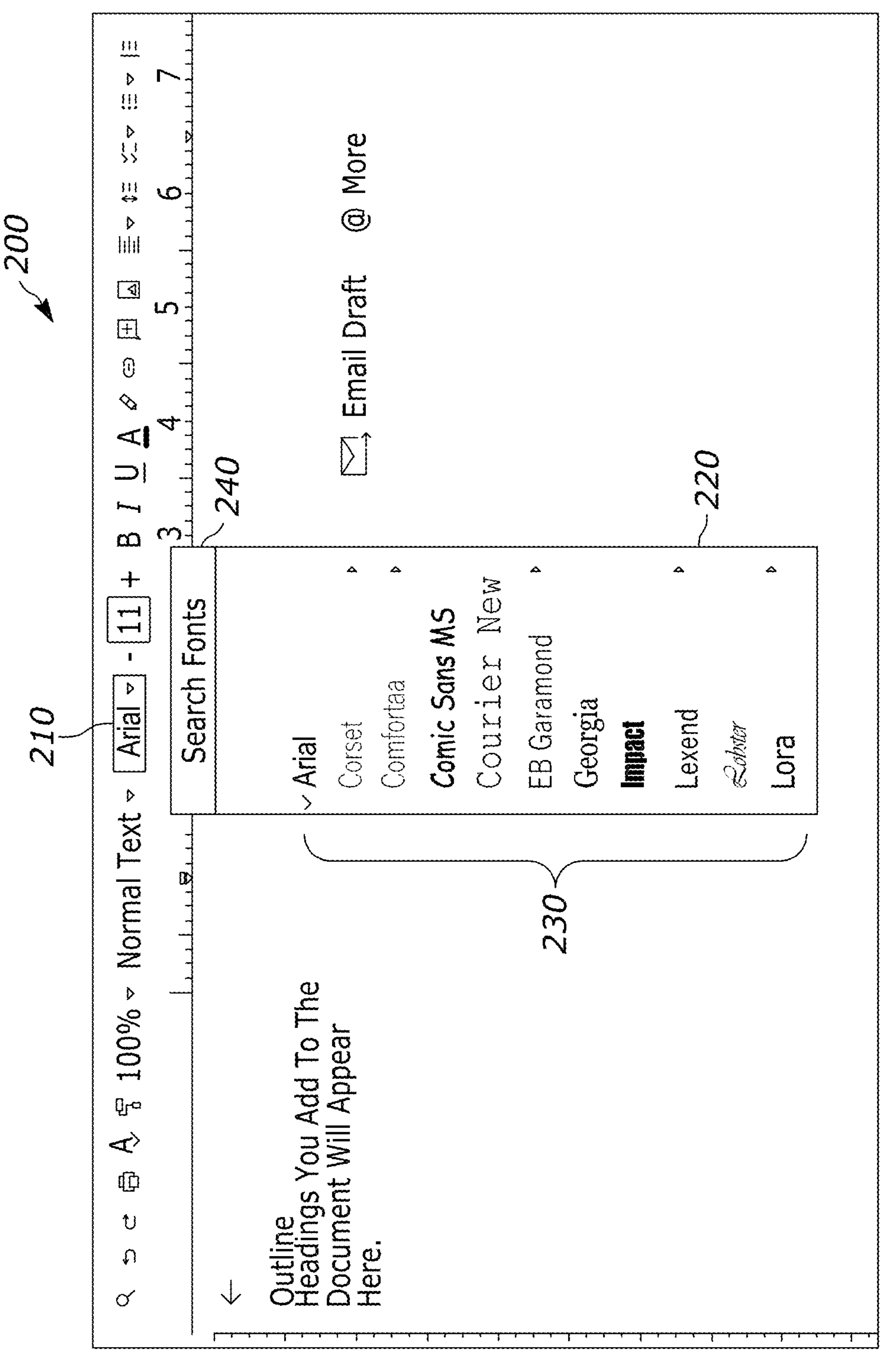
FIG. 2 shows an example graphical user interface (GUI) that may be used to initiate a font search consistent with present principles.

Now in reference to FIG. 2, suppose a user is developing a video game and wants to use a font for the side of a zombie spaceship that will form part of the video game. However, assume no suitable fonts immediately come to the user's mind. The graphical user interface (GUI) 200 of FIG. 2 therefore illustrates that the user might select a font selector 210 to command the user's device to present a font drop-down menu 220 that lists various fonts 230 that are available through whatever application ("app") is being used. But also assume that none of the fonts that are presented in the drop-down menu 220 match what the user had in mind to use on the side of the spaceship. Given this, the user may select the "search fonts" selector 240 that is presented with the menu 220 to search for fonts using a semantic search.

Figure 3:
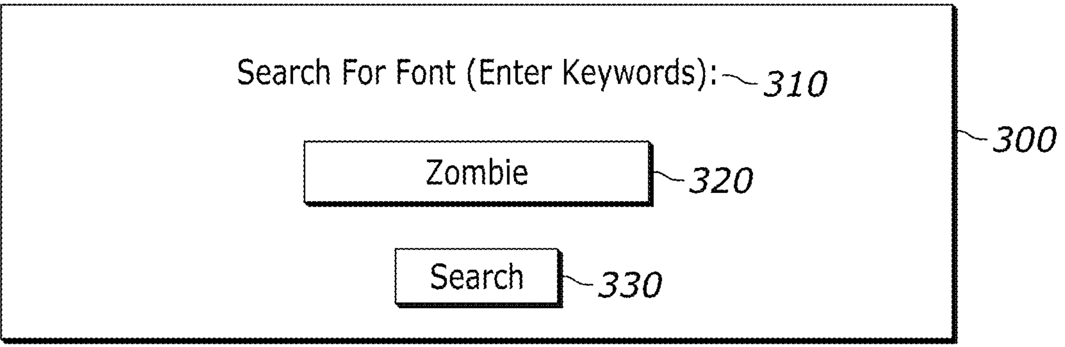
FIG. 3 shows an example GUI that may be used to enter a font search query consistent with present principles.

Accordingly, responsive to selection of the selector 240, the GUI 300 of FIG. 3 may be presented on the user's display (e.g., as a pop-up overlay on top of the GUI 200 as also presented on the display, or as its own screen). As shown, the GUI 300 may include a prompt 310 instructing the end-user to search for fonts by entering one or more keywords or natural language into text entry box 320. The user may then select the box 320 and use a hard or soft keyboard, voice input, or other input method to enter the keywords or natural language for what the user has in mind. Assume here that the user has entered a single keyword—"zombie"—as shown. Once the user's desired text has been entered into the box 320, the user may select the "search" selector 330 to command the machine-learning based system to search a multi-modal vector space for fonts that are semantically close to what the user entered into box 320.

Figure 4:
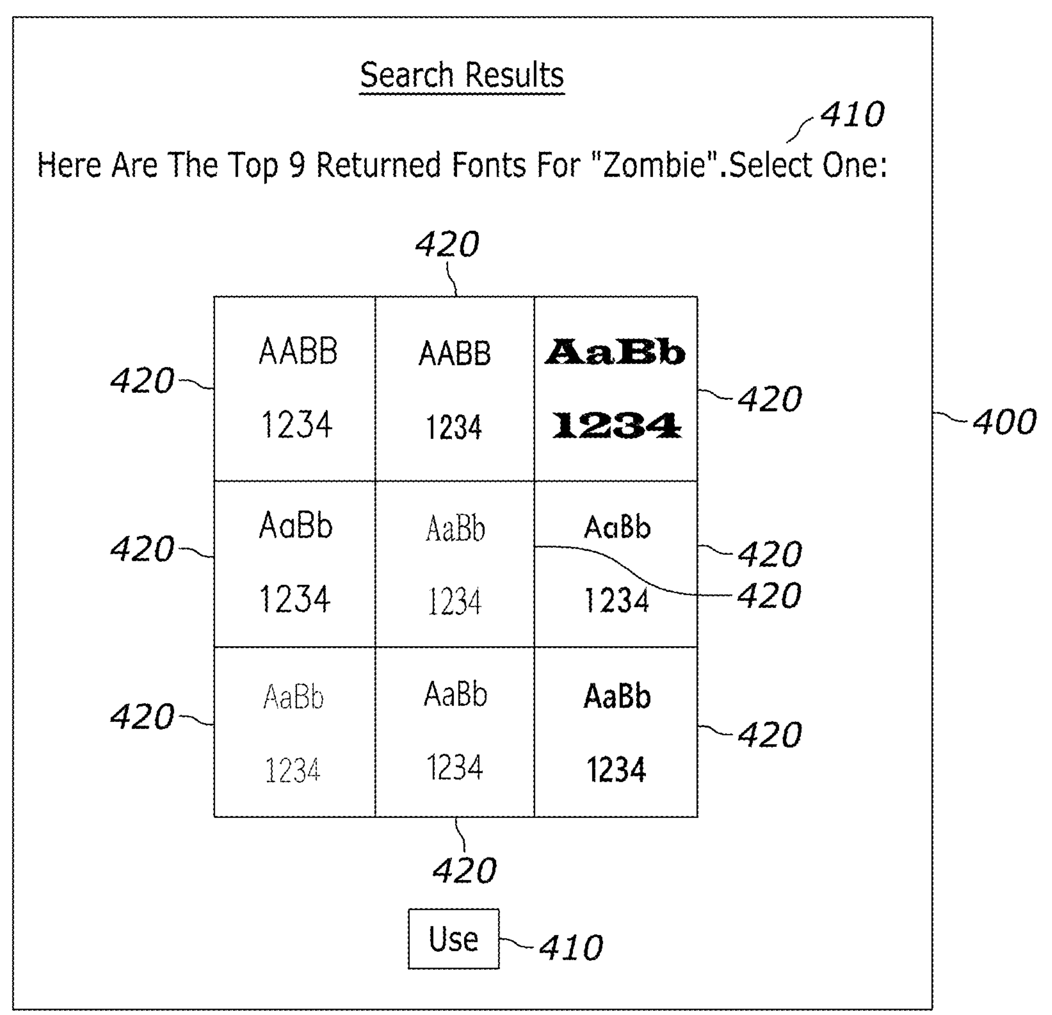
FIG. 4 shows an example GUI that may present font search query results consistent with present principles.

FIG. 4 demonstrates example search results that may then be returned by the system based on the query (e.g., in descending order of closeness). A search result GUI 400 may therefore include text 410 that indicates that nine search results have been returned for the search term "zombie". The text 410 may also prompt the user to select one of the different fonts as represented in different visual images 420 of the respective fonts themselves. The images 420 may thus help the user visually identify what they had in mind, with each image 420 also being separately selectable to select the associated font itself. Once a desired font has been selected via a given image 420, the user can then select the "use" selector 430. In response to selection of the selector 430, the selected font may then be auto-configured as the currently-operative font in whatever app the user is currently using to design the zombie spaceship video game. This might include a graphic design app, a kinematic motion app, and/or another type of game design app.

Figure 5:
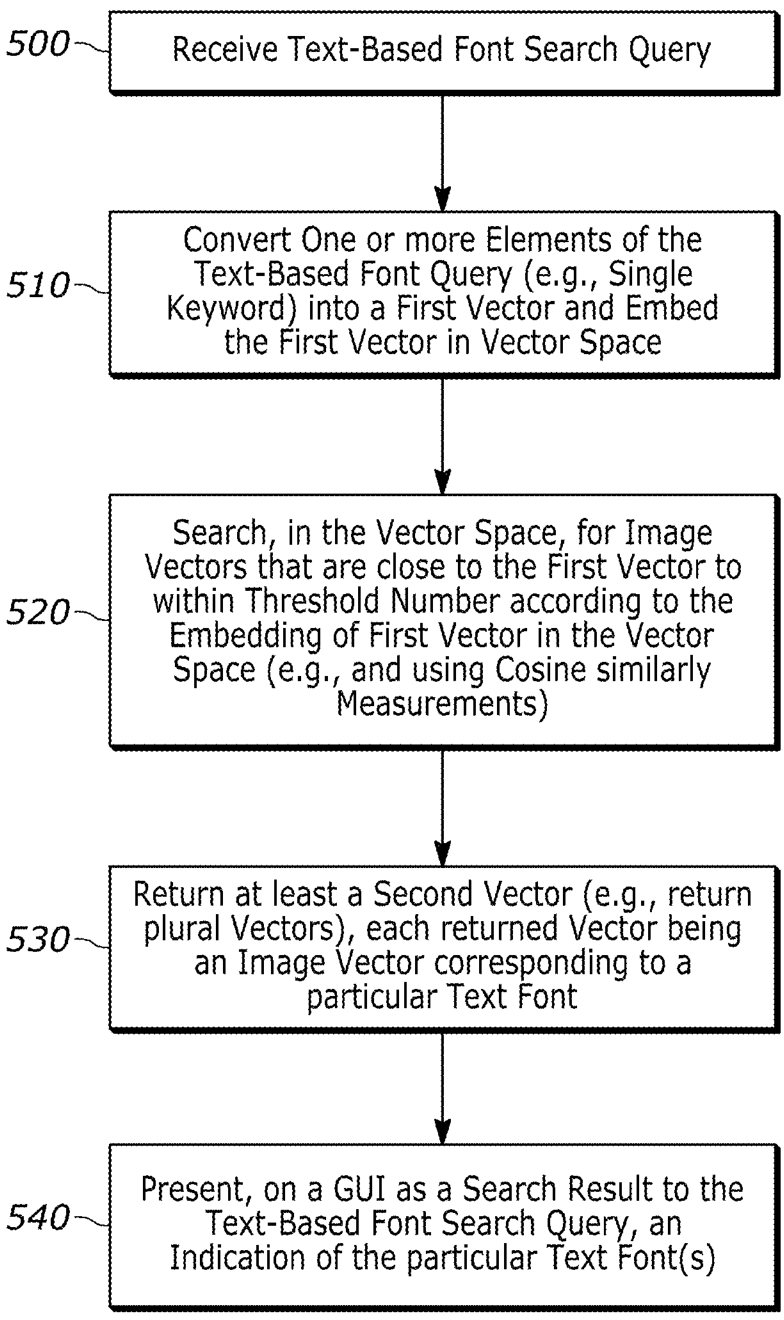
FIG. 5 shows example logic in example flow chart format that may be executed by a system/apparatus to search for fonts according to a query consistent with present principles.

Now in reference to FIG. 5, this figure shows example logic that may be executed by an apparatus such as the CE device 12, a client device, and/or a coordinating server alone or in any appropriate combination consistent with present principles. Thus, in some examples the logic may be executed by a client device alone. In other examples, the logic may be executed by the remotely-located server alone. In still other examples, the logic may be executed by a client device and remotely-located server, where the client device performs some steps while the server performs other steps, and/or where the client device and server work together to perform a given step. Further note that while the logic of FIG. 5 is shown in flow chart format, other suitable logic may also be used.

Beginning at block 500, the apparatus may receive a text-based font search query. For example, the query may be received via the GUI 300 described above. From block 500 the logic may then proceed to block 510.

In response to receipt of the text-based font search query, at block 510 the apparatus may convert one or more elements of the text-based font query (e.g., a single keyword selected or otherwise identified from the query) into a first vector and then embed the first vector in vector space. The vector space may be a multi-modal text-image vector space preconfigured with respective font vectors for text and respective font vectors for images. The one or more elements of the user's query may therefore be vectorized into the first vector, rendering a word embedding for placement in the multi-modal vector space. The system may use CLIP (or another suitable model) to embed the first vector into the multi-modal vector space after generating the first vector using CLIP or another suitable word embedding generator, such as a term frequency-inverse document frequency (tf-idf) model or Word2Vec model.

Also, note that a single keyword and only a single keyword from the query may be selected for vectorization in some instances to cut down on potentially inapposite search results, giving the system a more precise search target. This might be done, for example, where other aspects of the query would not be particularly helpful for semantic context anyway. E.g., the query might include "search for text with a zombie vibe", with everything before and after "zombie" being omitted from vectorization. As another example, multiple nouns might be entered as part of the query, or an adjective-noun word combination might be entered, and here topic analysis and/or other natural language processing techniques may be executed to extract or otherwise identify a single-word noun as the topic for searching.

Or for more-robust search results, two nouns or an adjective-noun combination may be searched together based on their semantic interrelationship to return potentially apposite search results for the multi-word term (e.g., "zombie spaceship"), assuming such search results are semantically close to the vectorized words to within a threshold number of closest total search results.

As yet another example, multi-word text as just described may be vectorized first to determine if any vectorized fonts are within the threshold number of vectors, in the vector space, to the multi-word term. Then responsive to no results being returned, or responsive to less than a threshold amount of results being returned (e.g., only one search result, giving the user few options), one or the other of the single words themselves from the multi-word term may then be vectorized apart from the other word(s) of the query to return additional results based on the resulting single-word embedding vector. Moreover, if a search result for a multi-word term is returned and search results for a single-word term are also returned for the same query, the multi-word result(s) may be prioritized over the single-word results such as by presenting the multi-word result(s) higher up and more to the left on a search result GUI like the GUI 400 of FIG. 4.

Thus, at block 520 the apparatus may actually search, in the multi-modal vector space that includes vectors for text and vectors for images, for image vectors that are semantically close to the first (word) vector according to the embedding of the first vector in the vector space. The image vectors that are searched are therefore understood to be image embeddings as also embedded in the same vector space as the first vector. Additionally, note that the image vectors may be vectors for respective font images for different respective fonts, with the font images being previously rendered by the system and embedded in the vector space prior to receipt of the text-based font search query itself.

Beyond the text-image multimodal vector space, as another example of a vector space that may be searched, in some examples a unimodal (text) vector space may be searched in addition to or in lieu of the multi-modal vector space. Here, the unimodal vector space may already include/be configured with vectors for different fonts, but with the fonts' vectors established by respective word embeddings as generated from text descriptions of each rendered font image. Thus, each rendered font image may be provided as input to a large multimodal model (LMM), such as GPT4, along with a prompt for the LMM to return a text description of the rendered font image. The text description for each font image may then itself be vectorized and placed into the unimodal (word/text) vector space prior to searching.

Further still, in yet another example implementation, the vectorized word embeddings of the LMM-based font descriptions as just described above may be embedded into a multi-modal vector space (rather than a unimodal vector space) along with font image embeddings so that both the word-based embeddings and the image-based embeddings may be searched against the user's query. Here, the image embeddings may represent respective images of different text fonts, and the word embeddings may represent respective text descriptions of the different text fonts. In some instances, this combination may result in more robust search results being returned by the system.

Still in reference to block 520, note more generally that the apparatus may thus search for preconfigured image vectors and/or preconfigured word vectors in the vector space(s) at this step to identify existing vectors that are semantically close to the first vector according to the embedding of the first vector in the vector space. In non-limiting example implementations, close to the first vector may be defined as being within a threshold number of closest image vectors, in the vector space, to the first vector (e.g., within the closest five vectors). Respective cosine similarity measurements may therefore be used to identify the angle/distance, in the vector space(s), of each of the existing image/word vectors to the first vector from the search query to determine which vectors are close to the first vector (based on being within the threshold number of closest vectors).

From block 520 the logic of FIG. 5 may then proceed to block 530. At block 530, based on the search, the apparatus may return at least a second vector and potentially plural image/word vectors as search results, with each returned vector being close to the first vector to within the threshold number according to the embedding of the first vector in the vector space, and with each returned vector being an image or word vector corresponding to a particular text font. Thus, each returned image vector may be, in the vector space, a text font image vector that is close to the first vector in that it falls within the threshold number of closest vectors, with each of the plural returned image vectors corresponding to a different respective text font as other returned image vectors. Additionally or alternatively, each returned word vector may be, in the vector space, a text font word vector that is close to the first vector in that it falls within the threshold number of closest vectors, with each of the plural returned word vectors corresponding to a different respective text font as other returned word vectors. Also note that if both a word vector and image vector are returned for the same font type, the apparatus may still only list that font type once on a GUI like the search results GUI 400 of FIG. 4.

Continuing to block 540 and based on the return of the preconfigured vectors that are determined as close to the first vector, the apparatus may then present an indication of each particular text font that is returned as a search result to the text-based font search query. The indications for each returned result as presented on the GUI may therefore include an image of multiple characters in the particular text font as well as a selector that is selectable to use the particular text font, as both shown in FIG. 4. Or if desired, the indication for each returned result may include an image of only a single character in the associated text font.

Additionally or alternatively, the indications presented on the GUI may include a text description of each returned text font, such as a predetermined description provided by a developer or a dynamically-generated natural language description as generated by the apparatus autonomously from metadata tags using a large language model (LLM) or other text generator. In addition to or in lieu of the foregoing, the indication for each returned result may include a name of the particular text font (e.g., Times New Roman, Arial, etc.) Note that in some examples, each returned result that is within the threshold number of closest vectors may be presented on the GUI at block 540. However, in other examples, only a subset of the closest results may be presented so as to not overwhelm the user.

Figure 6:
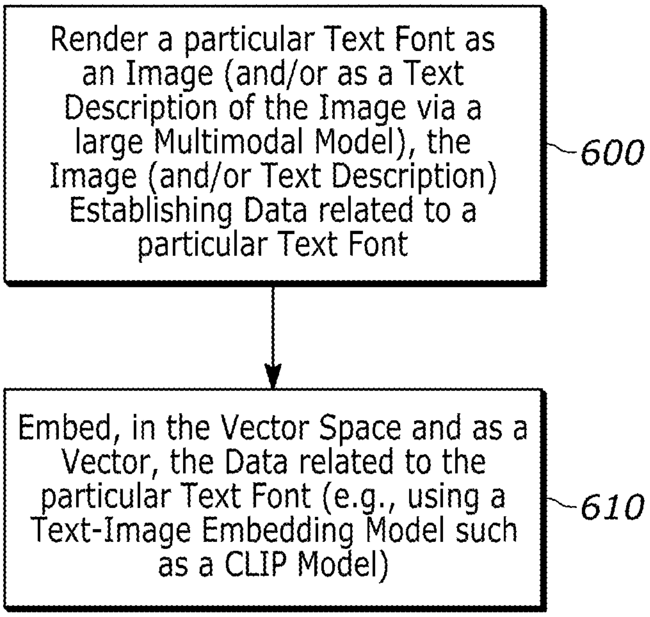
FIG. 6 shows example logic in example flow chart format that may be executed by a system/apparatus to embed image vectors and/or word vectors in the same vector space for subsequent font searching consistent with present principles.

Continuing the detailed description in reference to FIG. 6, this figure also shows example logic that may be executed by an apparatus such as the CE device 12, a client device, and/or a coordinating server alone or in any appropriate combination consistent with present principles. The logic of FIG. 6 may be executed prior to deploying a vector space for font searching. The logic of FIG. 6 may therefore be used to configure the vector space by populating it with image vector embeddings and word vector embeddings for different text fonts consistent with the description herein.

Accordingly, at block 600 the apparatus may render each particular text font as an image (e.g., using Javascript, a text-to-image converter, etc.) and then vectorize each rendered image as data related to the respective text font itself. In certain examples, each uppercase and lowercase letter of the text font may be rendered together as a single image along with numbers from 0 to 9 in the same font. In other examples, only a subset of uppercase and lowercase fonts and numbers from the respective font may be rendered together as a single image (e.g., only uppercase and lowercase "A" and "B" along with the numbers 1, 2, 3, and 4 in the same font).

To vectorize each rendered image, CLIP may be used, as may be another suitable image vectorizer model (e.g., a pre-trained convolutional neural network). Also note consistent with the description above that in some examples, in addition to or in lieu of vectorizing images, text descriptions of the images may be rendered using an LMM and then vectorized (e.g., using CLIP, a tf-idf model, Word2Vec model) as data related to the respective text font itself.

From block 600 the logic may then proceed to block 610. At block 610 the apparatus may embed the image vectors and the word vectors in a multi-modal vector space using CLIP or other suitable text-image embedding model. Then after the vector space has been configured according to the description of FIG. 6, the vector space/database may then be searched according to a font search query per FIG. 5 and other portions of this detailed description.

It may now be appreciated that semantic-based font searching in vector space may be realized according to the principles set forth herein. Text and images may therefore be put into a same embedded space so that things that are close together in the space may be returned as search results, harnessing the power of large-scale AI image indexing and the associated metadata that comes with those images.

Thus, data of different modalities may be located close together in vector space to return a particular font based on a semantic search. So, for example, if "horse" fonts are searched, fonts that have previously appeared on or next to horses in images and videos on the Internet may be returned as potential matches since the query term "horse" would be close to horse-related font images in vector space. Likewise, if "car" fonts are searched, fonts that previously have appeared on or next to cars in images and videos on the Internet may be returned as potential matches since the query term "car" would be close to car-related font images in vector space. In this way, predetermined metadata tags or labels for the fonts themselves need not be included in the font database of, say, a word processing document. Instead, CLIP and the immense scale of a network such as the Internet can be used to dynamically locate fonts that were previously used in a context that is the same as or similar to the one from the font search query itself.

While the particular embodiments are herein shown and described in detail, it is to be understood that the subject matter which is encompassed by the present application is limited only by the claims.

What is claimed is:

1. An apparatus, comprising:

at least one processor system configured to:

receive a query representing a semantic-based search for a text font;

in response to receipt of the query, convert one or more elements of the query into a first vector that represents the semantic-based search within a vector space of fonts where semantically similar fonts are arranged closer to one another than semantically dissimilar fonts;

search, in the vector space, for vectors representing one or more types of text fonts using the first vector that represents the semantic-based search;

based on the search, return a second vector that represents a particular text font that semantically matches the query; and based on the return of the second vector, present, on a graphical user interface (GUI) as a search result to the query, an indication of the particular text font.

2. The apparatus of claim 1, wherein the second vector is embedded in the vector space.

3. The apparatus of claim 2, wherein the second vector was embedded in the vector space prior to receipt of the query.

4. The apparatus of claim 1, wherein searching for the vectors representing the one or more types of text fonts using the first vector comprises:

searching for image vectors that are within a threshold number of closest vectors, in the vector space, to the first vector.

5. The apparatus of claim 4, wherein the closest vectors are determined using respective cosine similarity measurements for respective vectors in the vector space.

6. The apparatus of claim 1, wherein the at least one processor system is programmed with instructions to:

based on the search, return a set of vectors that are within a threshold number of closest vectors to the first vector in the vector space, the second vector being among the set of vectors.

7. The apparatus of claim 6, wherein each of the set of vectors are, in the vector space, text font image vectors that are within a threshold distance from the first vector, each of the set of vectors corresponding to a different respective text font.

8. The apparatus of claim 1, wherein the one or more elements consist of a single keyword identified from the query.

9. The apparatus of claim 1, wherein the at least one processor system is configured to:

embed, using a text-image embedding model, data related to the particular text font in the vector space and as the second vector.

10. The apparatus of claim 9, wherein the text-image embedding model comprises a contrastive language-image pretraining (CLIP) model.

11. The apparatus of claim 9, wherein the at least one processor system is configured to:

prior to embedding the data in the vector space as the second vector, render the particular text font as an image, the image establishing the data; and embed the image in the vector space as the second vector using the text-image embedding model.

12. The apparatus of claim 1, wherein the indication of the particular text font as presented on the GUI comprises one or more of: an image of multiple characters in the particular text font, an image of a single character in the particular text font, a text description of the particular text font, a name of the particular text font, a selector that is selectable to use the particular text font.

13. A method, comprising:

receiving a query representing a semantic-based search for a text font;

in response to receiving the query, converting one or more elements of the query into a first vector that represents the semantic-based search within a vector space of fonts where semantically similar fonts are arranged closer to one another than semantically dissimilar fonts;

searching, in the vector space, for vectors representing one or more types of text fonts using the first vector that represents the semantic-based search;

based on the searching, returning a second vector that represents a particular text font that semantically matches the query; and based on the returning of the second vector, presenting, at a device, an indication of the particular text font.

14. The method of claim 13, comprising:

presenting the indication on a graphical user interface (GUI) as a search result to the query.

15. The method of claim 13, wherein searching for the vectors representing the one or more types of text fonts using the first vector comprises:

searching for image vectors that are within a threshold number of closest vectors, in the vector space, to the first vector.

16. The method of claim 13, comprising:

based on the search, returning a set of vectors that are within a threshold number of closest vectors to the first vector in the vector space, the second vector being among the set of vectors.

17. The method of claim 16, comprising:

using respective cosine similarity measurements for respective vectors in the vector space to determine the closest vectors, in the vector space, to the first vector according to the first vector in the vector space.

18. An apparatus, comprising:

at least one computer readable storage medium (CRSM) that is not a transitory signal, the at least one CRSM comprising instructions that when executed by a processor system cause the processor system to perform operations comprising:

receive a query representing a semantic-based search for a text font;

in response to receipt of the query, convert one or more elements of the query into a first vector that represents the semantic-based search within a vector space of fonts where semantically similar fonts are arranged closer to one another than semantically dissimilar fonts;

search, in the vector space, for vectors representing one or more types of text fonts using the first vector that represents the semantic-based search;

based on the search, return a second vector that represents a particular text font that semantically matches the query; and based on the return of the second vector, present a search result to the query, the search result indicating the particular text font.

19. The apparatus of claim 18, wherein the second vector establishes an image embedding in the vector space, the image embedding representing an image of the particular text font.

20. The apparatus of claim 18, wherein the second vector establishes a word embedding in the vector space, the word embedding representing a text description of an appearance of the particular text font.

* * * * *